Dec. 24, 1968

W. BECKER ET AL 3,418,207

SYSTEM FOR FUNCTIONAL SUPERVISION OF HEAT-INSULATING
LAYERS IN NUCLEAR REACTOR CHANNELS

Filed June 6, 1966

INVENTOR

BY *Stevens, Davis, Miller & Mosher*
ATTORNEYS

United States Patent Office 3,418,207
Patented Dec. 24, 1968

3,418,207
SYSTEM FOR FUNCTIONAL SUPERVISION OF HEAT-INSULATING LAYERS IN NUCLEAR REACTOR CHANNELS
Winfried Becker, Arolo, Varese, Sergio Finzi, Masnago, Ernst R. Jorzik, Cardana di Besozzo, and Eggert Ohlmer, Velate, Varese, Italy, assignors to European Atomic Energy Community (Euratom), Brussels, Belgium
Filed June 6, 1966, Ser. No. 555,530
Claims priority, application Germany, June 24, 1965, E 29,569
6 Claims. (Cl. 176—19)

ABSTRACT OF THE DISCLOSURE

A system for the operational monitoring of thermal insulating layers which are to impede heat transfer from nuclear-reactor fuel elements to the channel tubes surrounding them by means of an electric cable which is in good heat contact with the tube and the characteristic impedance of which changes according to temperature changes. A pulse generator and oscilloscope are connected to the cable to detect hot spots by the principle of reflection. The cable is a two wire cable housed in a channel member opening against the channel tube. Spacers divide the channel member into a series of watertight segments.

---

The present invention relates to a system for functional supervision of heat-insulating layers which are intended to retard the transfer of heat from nuclear-reactor fuel elements to the channel pipes surrounding them.

Fuel elements in nuclear reactors are generally arranged in pressure-resistant tubes which take up the high pressure of the coolant washing down the elements. One differentiates in this connection between "cold" and "hot" tubes, with the former having heat-insulating layers on the inner wall which impede the transfer of heat from the coolant to the tube. The fact that it is desired to maintain the tube cold has some special reason, for instance, because the load-bearing capacity of the material decreases with an increase in the temperature or because there may be a certain susceptibility to corrosion upon contact with the hot coolant.

For the heat-insulating of the inner wall of the tube, various methods have been provided, for instance, slots which are filled with gas or other insulating materials, ceramic coatings or else special insulations which are applied to the matrices of the fuel elements. In connection with all possibilities, however, cases are conceivable in which the insulation, due to some damage, fails locally or even over long lengths in the channel. In these cases the pressure tube will develop at such places a far higher temperature than is contemplated for normal operation. It exhibits towards the outside hot spots where the water evaporates with a greater or lesser intensity of formation of bubbles.

In order to be able to take such appropriate action on the reactor as is necessary in cases of such accidents, first of all, the presence of damage and then the exact location of the damage in the channels must be determined. A conventional way of doing this is measuring the temperature of the surfaces of the channels, for instance, with thermocouples. However, this method is impractical since, for an effective control, about 60 to 100 thermocouples would have to be provided for the surface of a single channel. In a reactor with about 500 channels, this would result in such a large number of thermocouples that this method would automatically be excluded.

Since the hot spots make themselves perceptible on the outside by local evaporation of water, one could contemplate using optical or acoustic means in the water container to obtain an indication as to the formation of bubbles. However, use of such devices in the reactor is impossible also due to the large number and arrangement of the channel surfaces to be checked.

The above-described problem is solved by the present invention at reasonable expense and with a sufficient degree of accuracy.

It has already been proposed, in order to monitor the temperature of heavy-current cables (German Patent 1,134,532 issued Feb. 21, 1963), to cover the sheathing of the cable with an electric line which is in good thermal contact with the sheathing and which will change its characteristic impedance upon a change in temperature; by means of a pulse generator and an oscilloscope, which are connected to the cable, hot spots are localized by the well-known reflection principle.

The customary electric cables are, however, not suitable for use in reactor channels due to the level of radiation and the temperature under whose influence their electrical properties gradually change. In particular, however, when the cable is in direct contact with the liquid moderator or coolant (for instance, water), failures would be likely to occur due to liquid penetrating into the cable. The present invention overcomes this difficulty in operation of cables on the outer walls of nuclear reactor channels which are washed by an electrically non-conductive boilable liquid.

The invention consists of a two-wire cable having wire spacers spaced apart from each other and the whole enclosed in a U-shaped covering plate. The spacers are arranged on the wire at distances apart of the order of magnitude of the desired locating accuracy. The cable sections formed in this manner are closed off in practically a watertight manner from each other so that, while the cable is filled with the liquid when in operation, nevertheless vapor bubbles which come from a hot spot are substantially retained by the next higher spacer so that a measurable change in the dielectric constant of the cable occurs there.

The invention will be described in further detail below with reference to FIGS. 1 to 3 in which:

FIG. 1 is limited to showing the features of a liquid-moderated reactor which are of essential importance in the present case. The reactor vessel 1 is filled with moderator liquid into which fuel-element channels and other channels (for control and measuring purposes) extend.

Figure 1:
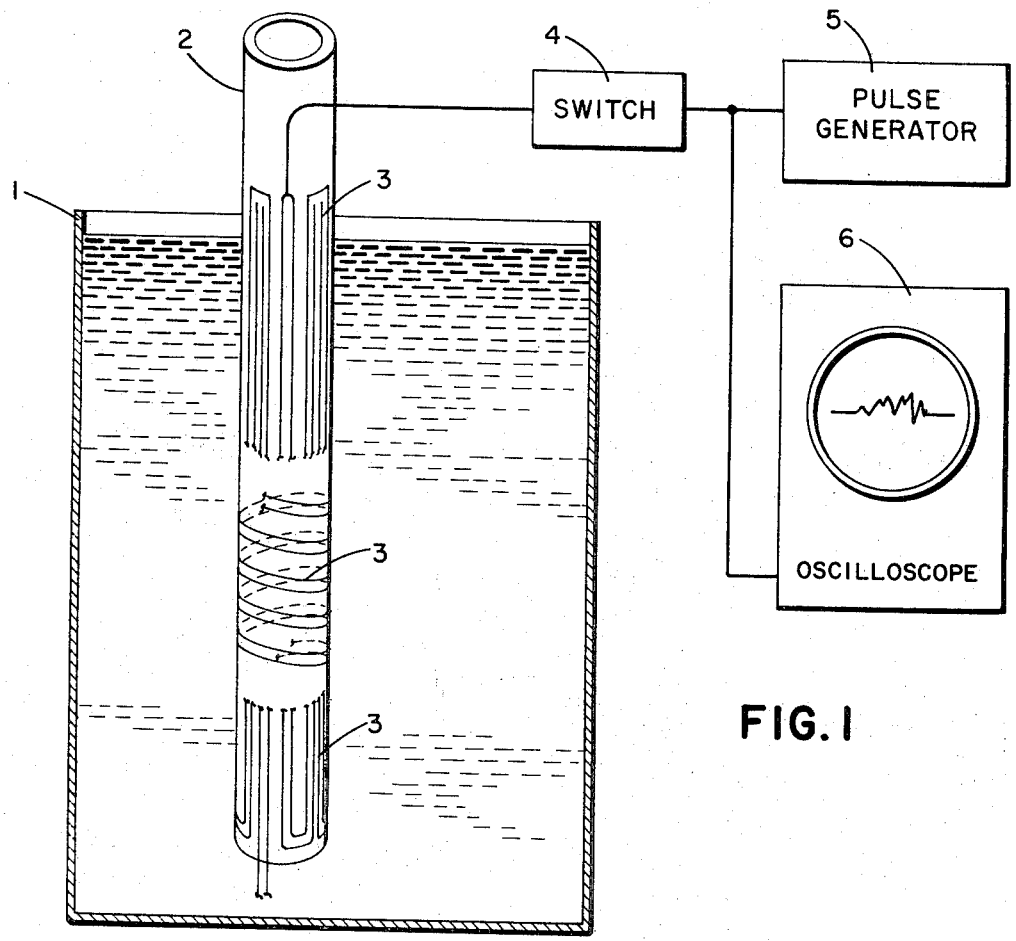
FIG. 1 shows schematically a channel with hot-spot monitoring.

A fuel-element channel 2 consists of a pressure-resistant tube in which there is a fuel element and a coolant circuit. The pressure-resistant tube is protected from the high temperatures of the fuel element and of the coolant by a layer of heat insulation.

In order to monitor the proper operation of the insulating layer, the outer circumferential surface of the pressure tube is covered by a cable 3 to sufficient density so that no local overheating of the tube can remain undiscovered. The cable can, as shown in the figure, be fastened in sinusoidal or spiral shape onto the outer cylindrical surface of the tube. At one end the cable is connected via a changeover switch 4 with a pulse generator 5 and an oscilloscope 6. The changeover switch provides for selective connection of the transmitting and receiving instruments with any one of the channels of the reactor, up to several hundred channels, frequently being present.

If a short square wave pulse is fed into the cable and the trace of this pulse observed on the oscilloscope, there is produced, in case of an undisturbed homogeneous cable, merely a single reflection of the wave train at the free end of the cable insofar as the latter is not terminated free of reflection with the characteristic impedance of the cable. In such case, of course, no reflection at all occurs.

Figure 2A:
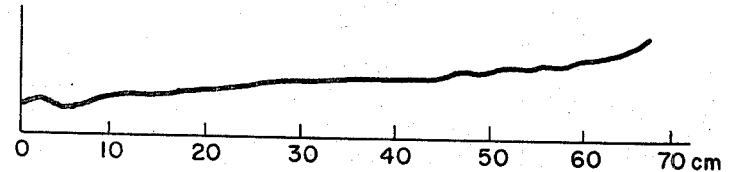
FIGS. 2a and 2b show two oscillograms of characteristic form.
Figure 2B:
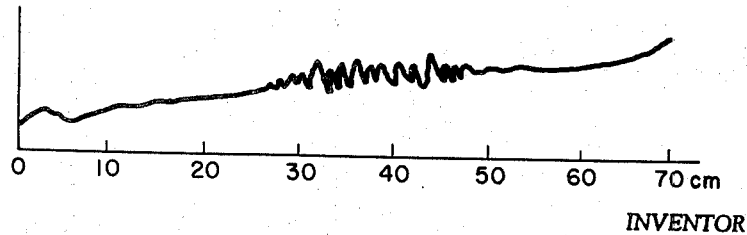

FIG. 2a shows the variation of the voltage at the generator-side end of the cable after the feeding of the pulse but before the reception of the main reflection coming from the end of the cable. FIG. 2b shows a disturbed cable in which at about the center of the cable the dielectric constant has been changed by heating so that a smaller part of the energy of the wave train is reflected from that point in front of the main reflection. The time interval between the reflection and the moment of pulsing is therefore a measure of the distance of the disturbance from the end of the cable.

The cable, in accordance with the invention, which is intended for operation on the outer wall of nuclear-reactor channels which are washed over by an electrically non-conductive boilable liquid, will be explained below with reference to FIG. 3. The cable consists of two bare wires 7 and 8, they being maintained a constant distance apart by spacers 9 which are loosely placed on the cylindrical wall 10 of the pressure tube. Over the wires and the spacers, there is placed a U-shaped surrounding tube 11, the free ends of which are fastened to the cylindrical wall of the pressure tube, for instance, by spot welding.

The spacers are arranged at distances apart which lie within the order of magnitude of the desired precision of measurement, and they close off in a practically watertight fashion, the channel sections thus formed so that, while the cable becomes filled with the moderator liquid (for instance, with water) when in operation, nevertheless vapor bubbles which are produced at a hot spot are substantially retained by the next higher spacer. Therefore, adjacent this spacer, a vapor dielectric is formed instead of a water dielectric. The change in dielectric constant inherent therein, by about a factor of eight, produces a partial reflection in accordance with FIG. 2b and thus gives an indication of a hot spot.

As compared with an arrangement utilizing an ordinary cable, the embodiment described above has various advantages—namely, penetration of moderator liquid into the cable does not lead to a failure in operation but to the planned and desired operation; the transfer of heat from the pressure tube to the cable dielectric takes place directly; the cable contains only metallic and ceramic parts, the resistance of which to radiation has been empirically proven.

Figure 3:
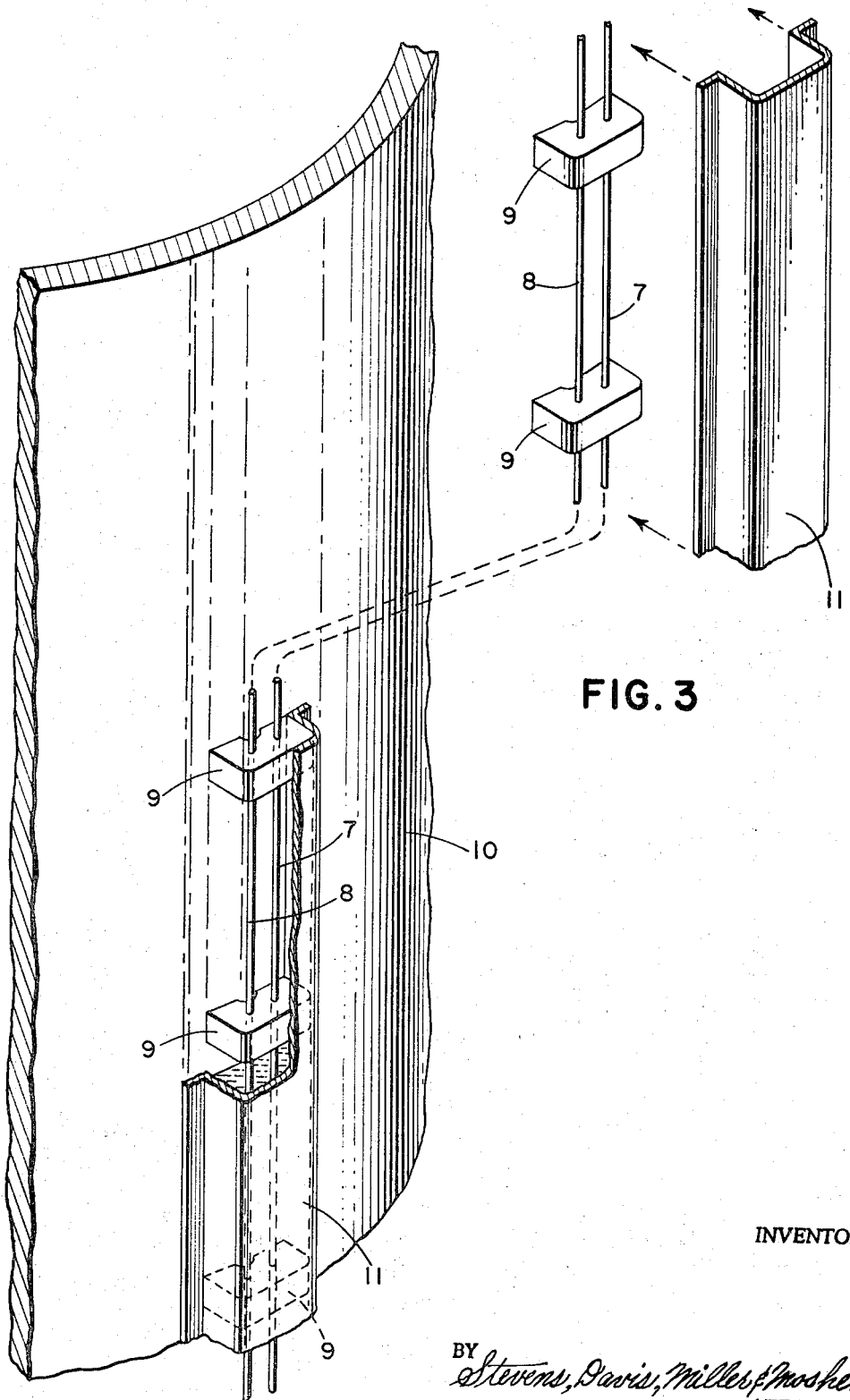
FIG. 3 shows a portion of the monitoring cable of the invention in detail and exploded view.

The cable of the invention which has been described and shown in FIG. 3 is therefore characterized by a particular simplicity in manufacture and dependability in operation. However, it is not the only possible embodiment of the invention. Instead of the square-shaped pulse, other suitable forms of pulse can be used, for instance, a wave train of given frequency.

In many cases it may be sufficient to lay the cable along one or more generatrices of the pressure-resistant tube; in other cases a tight covering of the entire circumferential surface tube (in a sinusoidal or spiral shape) may be necessary. One cable can also simultaneously monitor two or more tubes or else two cables can be provided for a particularly long pressure tube. The changeover device 4 can automatically test all cables periodically in succession or be manually operated. The cable end can be open, short-circuited, or, for instance, closed off with the characteristic impedance. The pressure tube can be vertical or horizontal.

The invention, finally, can be used not only for the detection of hot spots in nuclear reactor channels but, in general, wherever hot spots are to be located (for instance, in the chemical industry).

What is claimed is:
1. A system for the operational monitoring of thermal insulating layers on tubes and the like which are in direct contact with an electrically non-conductive boilable liquid comprising an electric cable, the characteristic impedance of which changes upon a change in temperature, said cable being in good thermal contact with said tube, pulse generating means and oscilloscope means connected to said cable, said cable comprising two non-insulated wires, spacer means disposed at intervals along said wires and holding them substantially parallel, a channel-shaped member enclosing said wires and spacers and together with the latter forming a series of substantially watertight cable sections, said cable sections being liquid filled in operation wherein a hot spot on said layer will cause said liquid to form vapor bubbles which will be retained by the next successive spacer and thereby cause a measurable change in the dielectric constant of the cable.

2. In a nuclear reactor, a system for the operational monitoring of thermal insulating layers which are to impede heat transfer from nuclear-reactor fuel elements to the tubes surrounding them, the outer walls of said tubes being washed by an electrically non-conductive boilable liquid, comprising an electric cable, the characteristic impedance of which changes upon a change in temperature, said cable being in good thermal contact with the outer walls of said tubes, pulse-generating means and oscilloscope means connected to said cable, said cable comprising two wires, a plurality of spacers regularly disposed along said wires holding them substantially equidistant, a U-shaped covering sheet, said sheet and a portion of said tube wall enclosing said wires and spacers, said spacers together with said sheet and said wall forming a plurality of substantially watertight cable sections which are liquid filled in operation wherein hot spots on said wall will cause said liquid to form vapor bubbles which will be retained by the next higher spacer and thereby cause a measurable change in the dielectric constant of the cable, said change causing a pulse from said pulse generating means to be reflected thus indicating the location of a hot spot.

3. A system according to claim 2 wherein said spacers are ceramic.

4. A system according to claim 2 wherein said spacers are disposed on said wires at distances on the order of magnitude according to the desired locating precision.

5. A system according to claim 2 wherein said cables are spirally wound on said tubes.

6. A system according to claim 2 wherein said spacers are made of insulating material.

References Cited

UNITED STATES PATENTS

| 3,110,657 | 11/1963 | Rault | 176—19 |
| 3,114,263 | 12/1963 | McCann | 176—19 |

REUBEN EPSTEIN, *Primary Examiner.*

U.S. Cl. X.R.

73—340; 324—52